March 21, 1939.   O. K. KJOLSETH   2,151,603
CENTER PLATE CUSHIONING DEVICE
Filed Oct. 23, 1937
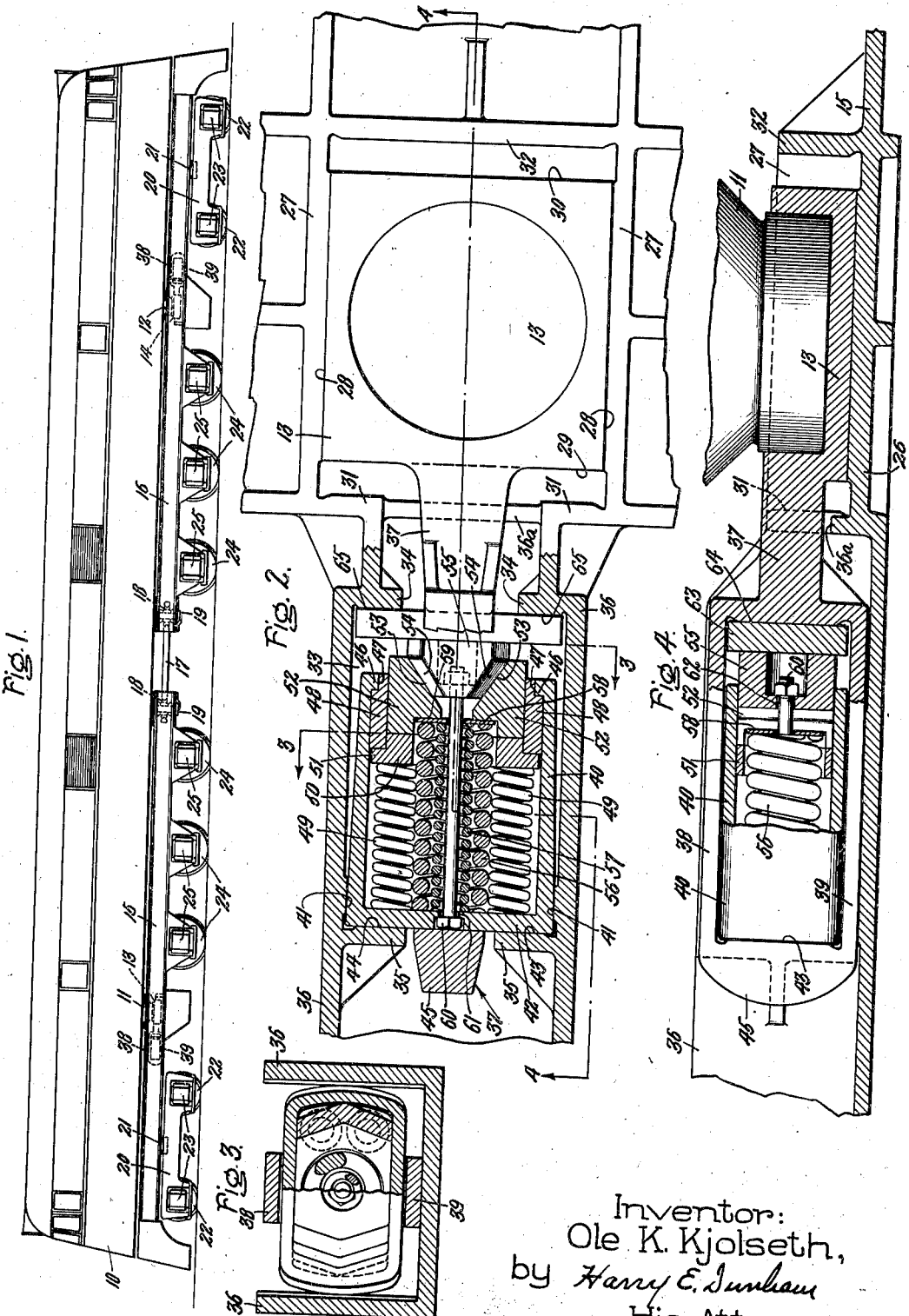
Inventor:
Ole K. Kjolseth,
by Harry E. Dunham
His Attorney.

Patented Mar. 21, 1939

2,151,603

UNITED STATES PATENT OFFICE 2,151,603

CENTER PLATE CUSHIONING DEVICE

Ole K. Kjolseth, Erie, Pa., assignor to General Electric Company, a corporation of New York Application October 23, 1937, Serial No. 170,631

3 Claims. (Cl. 105—199)

My invention relates to restraint or cushioning devices for railway vehicle center plates for restraining or cushioning relative movement between the center plate and the vehicle truck-supporting frame.

An object of my invention is to provide an improved and simplified restraint or cushioning device which will resiliently restrain and cushion relative movements and displacements between a vehicle center bearing plate and its supporting frame.

Another object of my invention is to provide an improved longitudinally movable center bearing plate support for a railway vehicle having a plurality of trucks.

Further objects and advantages of my invention will become apparent and my invention will be better understood from the following description referring to the accompanying drawing, and the features of novelty which characterize my invention will be pointed out with particularity in the claims annexed to and forming part of this specification.

In the drawing, Fig. 1 is a side elevation of a locomotive embodying my invention; Fig. 2 is a plan view, partly in section, illustrating an embodiment of my invention arranged on a main truck frame; Fig. 3 is a sectional view taken along line 3—3 of Fig. 2; and Fig. 4 is a side elevational view, partly in section, taken along line 4—4 of Fig. 2.

Referring to the drawing, an electric locomotive having a frame including a superstructure 10 is pivotally supported by center pins 11 and 12 on center bearing plates 13 and 14 on main truck frames 15 and 16, respectively. The main trucks are of the articulated type, and are coupled together at the inner ends by a coupler 17 which is secured to the inner ends of each of the trucks by universal ball and socket joints 18 which are secured to the main truck frames by upwardly extending pivot pins 19. To facilitate traversing curves in the track, the outer end of each of the main truck frames 15 and 16 is supported on an auxiliary truck 20 by a center bearing 21. The auxiliary trucks 20 are of the double axle type provided with wheels 22 mounted on axles journaled in journal boxes 23 which support the auxiliary truck frames 20.

The locomotive is propelled by driving wheels 24 through axles which are journaled in journal boxes 25 on which the frames of the main trucks 15 and 16 are supported. Irregularities in the track tend to produce oscillations of the trucks about the center pins 11 and 12 which pivotally support the locomotive frame, and when the locomotive traverses a curve in the track, there is a tendency for the distance to vary between the center bearing plates 13 and 14, so that some provision must be made for relative longitudinal movement between the truck center plates and the truck supporting frames. It is desirable that these movements or displacements of the center plates should be restrained or cushioned to provide a smooth operation of the vehicle and to reduce wear on the moving elements. In order to obtain a symmetrical displacement of the center bearing plate at each end of the locomotive, it is desirable that each center bearing plate should be provided with a cushioning device, however, if only one of the center plates is cushioned, the other center plate should also be made longitudinally movable to prevent excessive stresses in the structure.

The center bearing plates 13 and 14, in the illustrated arrangement, are of the same design, and both are made longitudinally movable and provided with the same type of cushioning devices. Figs. 2, 3, and 4 illustrate the arrangement of the center plate 13 and its cushioning device. The center bearing plate 13 is slidably supported for relative longitudinal movement on a supporting plate 26 of the main truck supporting frame 15 between longitudinally extending bearing guides 27 engaging longitudinally extending opposite sides 28 of the center plate 13. Transversely extending sides 29 and 30 of the center plate normally are arranged in spaced-apart relation with respect to transversely extending flanges 31 and 32 formed on the truck frame about the ends of the center plate. A pocket 33 for receiving a restraining or cushioning device is formed by flanges 34 and 35 extending transversely between longitudinally extending web members 36 of the main truck frame, with openings between the adjacent ends of adjacent flanges. A transversely extending opening 36ª also is formed in the transversely extending flange 31 in the supporting frame, and a shank 37 is formed on the side 29 of the center bearing plate 13, and extends therefrom through the opening 36ª in the flange 31 and the openings between the ends of the flanges 34 and 35 of the pocket. This shank 37 is formed intermediate the ends thereof as a yoke which extends within the pocket 33 and is provided with upper and lower sides 38 and 39, respectively, between which a buffing device is arranged. The buffing device may comprise any suitable conventional draft gear for resisting and cushioning movement of the center plate. The draft gear buffing device shown in the drawing includes a casing 40 having sides held in position between bearing surfaces 41 formed on the web member 36 of the supporting frame, and is closed at one end by an end wall 42 which engages bearing surfaces 43 and 44 formed on the inner side of the outer end 45 of the yoke 37 and the inner sides of the flanges 35, respectively. An inwardly extending retaining flange 46 is formed on each of the vertically extending sides at the other end of the casing 40 and engages a complementary groove 47 formed on the outer end of a set of friction liners 48 which slidably engage the inner sides of the casing. These liners 48 are resiliently biased toward the open end of the casing 40 by a nest of coil springs 49 arranged within the casing 40 in engagement with the end wall 42 thereof and the inner surface of a follower plate 50 provided with flanges 51 which engage the inner ends of the friction liners 48. The outer flat surface of the follower plate 50 engages the inner end of a set of shoes 52 which slidably and frictionally engage the inner surfaces of the friction liners 48, and are formed with inclined longitudinally extending inner surfaces 53 arranged in engagement with complementary inclined or tapered surfaces 54 formed on a wedge 55. A pair of coil springs 56 and 57 are retained under compression between the end wall 42 of the casing 40 and a spring washer 58 which engages a spring seat 59 formed on the inner end of the shoes 52 and biases the shoes 52 away from the end wall 42. A retaining bolt 60 extends through an opening 61 formed in the end wall 42, through the coil springs 56 and 57, an opening in the spring washer 58, between the shoes 52, and through an opening 62 in the wedge 55 in order to limit the relative longitudinal displacement between the wedge 55 and the end of the casing and to secure the draft gear buffing device in assembled relationship. A plate 63 is arranged between the outer end of the wedge 55 and the inner end of the yoke on the shank 37 and is arranged to engage bearing surfaces 64 and 65 formed on the inner side of the end of the yoke and on the inner sides of the flanges 34, respectively.

This construction provides for free limited longitudinal movement of the center bearing plate 13 when the vehicle traverses a curve in the track. Such movement tends to move longitudinally the yoke of the shank 37 with respect to the draft gear in a direction so as to move the plate 63 and wedge 55 towards the end wall 42 of the casing against the flanges 35, or to move the end 45 of the shank 37 and the end wall 42 of the casing 40 towards the wedge 55 and the plate 63 against the flanges 34. In either case, such movement is resisted by the friction between the shoes 52 and the friction liners 48 by the wedging action of the wedge 55 on the inclined surfaces 53 of the shoes 48, and is also resisted by the compression of the coil springs 49, 56, and 57, so as to resiliently restrain and cushion the movement of the center bearing plate 15 and reduce shocks and noise which might result from the movement of the center bearing plate.

While I have illustrated and described a particular embodiment of my invention, modifications thereof will occur to those skilled in the art. I desire it to be understood, therefore, that my invention is not to be limited to the particular arrangement disclosed, and I intend in the appended claims to cover all modifications which do not depart from the spirit and scope of my invention.

What I claim as new and desire to secure by Letters Patent of the United States, is:

1. In a a railway vehicle having a retaining pocket, a railway vehicle center plate cushioning device including a center plate, a casing in said retaining pocket, a set of friction liners arranged for longitudinal movement in said casing, a set of shoes arranged for longitudinal movement in said casing in engagement with said liners, a wedge arranged in engagement with said shoes, a follower plate arranged in said casing in engagement with an end of said liners and an end of said shoes, resilient spring means in said casing for resisting movement of said follower plate, and means including a shank extending from said center plate arranged to engage said wedge and said casing for transmitting forces between said center plate and said resilient spring means through said casing and said wedge to said shoes and spring means for cushioning longitudinal movements of said center plate, said retaining pocket being arranged to limit the relative movement of said casing and said wedge.

2. A railway vehicle having a supporting frame, a longitudinally movable center plate having a shank extending therefrom and arranged to support said vehicle on said supporting frame, said shank being provided with a yoke, and means including a resilient friction buffing device extending within said yoke and adapted to cooperate with said frame for resisting and cushioning longitudinal movement of said center plate.

3. A railway vehicle having a supporting frame, a center plate arranged to support said vehicle on said supporting frame, a retaining pocket in said supporting frame, a shank secured to said center plate and having a yoke extending within said pocket, and means including a friction buffing device extending between the sides of said yoke and adapted to cooperate with said retaining pocket for resisting movement of said center plate.

OLE K. KJOLSETH.